(12) United States Patent
Zhou et al.

(10) Patent No.: US 12,176,794 B2
(45) Date of Patent: Dec. 24, 2024

(54) OUTER-ROTOR BRUSHLESS MOTOR FOR A POWER TOOL

(71) Applicant: Black & Decker Inc., New Britain, CT (US)

(72) Inventors: Yuming Zhou, Yangzhou (CN); Fuchun Xie, Suzhou (CN); Tong Zheng, Suzhou (CN); Ming Jin, Suzhou (CN); Fujun Jin, Suzhou (CN); Weifeng Qian, Suzhou (CN)

(73) Assignee: Black & Decker Inc., New Britain, CT (US)

( * ) Notice: Subject to any disclaimer, the term of this patent is extended or adjusted under 35 U.S.C. 154(b) by 240 days.

(21) Appl. No.: 17/455,688

(22) Filed: Nov. 19, 2021

(65) Prior Publication Data

US 2023/0163664 A1    May 25, 2023

(51) Int. Cl.
| | |
|---|---|
| *H02K 9/06* | (2006.01) |
| *B25F 3/00* | (2006.01) |
| *B25F 5/00* | (2006.01) |
| *H02K 1/2786* | (2022.01) |

(52) U.S. Cl.
CPC ............... *H02K 9/06* (2013.01); *B25F 3/00* (2013.01); *B25F 5/008* (2013.01); *H02K 1/2786* (2013.01)

(58) Field of Classification Search
CPC ........ H02K 9/06; H02K 1/2786; H02K 1/187; H02K 5/1732; H02K 5/207; H02K 7/086; H02K 7/145; H02K 21/22; B25F 3/00; B25F 5/008
See application file for complete search history.

(56) References Cited

U.S. PATENT DOCUMENTS

| | | | |
|---|---|---|---|
| 4,133,230 | A | 1/1979 | Inaba et al. |
| 4,259,603 | A | 3/1981 | Uchiyama et al. |
| 4,540,906 | A | 9/1985 | Blom |
| 4,867,581 | A | 9/1989 | Schmidt et al. |
| 4,885,496 | A | 12/1989 | Wheeler |
| 5,099,164 | A | 3/1992 | Wheeler |
| 5,144,183 | A | 9/1992 | Farrenkopf |
| 5,182,848 | A | 2/1993 | Wheeler |
| 5,241,229 | A | 8/1993 | Katakura et al. |
| 5,245,234 | A | 9/1993 | Okada et al. |

(Continued)

FOREIGN PATENT DOCUMENTS

| | | |
|---|---|---|
| CA | 2828567 C | 3/2017 |
| CN | 103956846 A | 7/2014 |

(Continued)

OTHER PUBLICATIONS

EP Partial ESR dated Apr. 4, 2023 in corresponding EP application No. 22202102.4.

*Primary Examiner* — Maged M Almawri
*Assistant Examiner* — Riley Owen Stout
(74) *Attorney, Agent, or Firm* — Amir R. Rohani

(57) ABSTRACT

An outer-rotor brushless direct-current motor is provided. The motor includes a motor can that supports the motor components and a fan mounted on a rotor shaft inside the motor can to generate an airflow through the motor can. The motor can includes exhaust openings formed around the fan to allow the airflow to be expelled radially away from the fan, and intake openings formed at a distance from the exhaust openings to allow an airstream to be received radially into the motor can.

17 Claims, 9 Drawing Sheets

(56) References Cited

U.S. PATENT DOCUMENTS

| | | |
|---|---|---|
| 5,394,283 A | 2/1995 | Hans et al. |
| 5,497,040 A | 3/1996 | Sato |
| 5,591,017 A | 1/1997 | Dwyer |
| 5,654,598 A | 8/1997 | Horski |
| 5,844,338 A | 12/1998 | Horski |
| 5,898,988 A | 5/1999 | Horski |
| 5,994,803 A | 11/1999 | Jung |
| 6,069,766 A | 5/2000 | Battu et al. |
| 6,170,275 B1 | 1/2001 | Ueno et al. |
| 6,282,053 B1 | 8/2001 | MacLeod et al. |
| 6,300,695 B1 | 10/2001 | Neal |
| 6,362,554 B1 | 3/2002 | Neal |
| 6,437,464 B1 | 8/2002 | Neal |
| 6,501,616 B1 | 12/2002 | Neal |
| 6,617,747 B1 | 9/2003 | Petersen |
| 6,707,224 B1 | 3/2004 | Petersen |
| 6,798,111 B1 | 9/2004 | Petersen |
| 6,836,041 B2 | 12/2004 | Chou et al. |
| 6,853,102 B2 | 2/2005 | Itaya et al. |
| 6,992,419 B2 | 1/2006 | Kim et al. |
| 7,064,462 B2 | 6/2006 | Hempe et al. |
| 7,109,623 B2 | 9/2006 | Wada et al. |
| 7,122,923 B2 | 10/2006 | Lafontaine et al. |
| 7,166,948 B2 | 1/2007 | Petersen |
| 7,202,620 B2 | 4/2007 | Petersen |
| 7,356,906 B2 | 4/2008 | Kim et al. |
| 7,439,642 B2 | 10/2008 | Chen et al. |
| 7,443,074 B2 | 10/2008 | Kim et al. |
| 7,521,826 B2 | 4/2009 | Hempe et al. |
| 7,598,634 B2 | 10/2009 | Izumi |
| 7,652,406 B2 | 1/2010 | Kim et al. |
| 7,659,644 B2 | 2/2010 | Fukuno et al. |
| 7,671,884 B2 | 3/2010 | Itami et al. |
| 7,687,959 B1 | 3/2010 | Lee |
| 7,768,166 B2 | 8/2010 | Lafontaine et al. |
| 7,800,267 B2 | 9/2010 | Sahara et al. |
| 7,859,155 B2 | 12/2010 | Sahara et al. |
| 8,016,574 B2 | 9/2011 | De Filippis et al. |
| 8,132,702 B2 | 3/2012 | Kunz et al. |
| 8,133,143 B2 | 3/2012 | Schoon |
| 8,207,642 B2 | 6/2012 | Lafontaine et al. |
| 8,449,424 B2 | 5/2013 | Schoon |
| 8,461,734 B2 | 6/2013 | Sahara et al. |
| 8,573,323 B2 | 11/2013 | Müller et al. |
| 8,816,544 B2 * | 8/2014 | Tanimoto ............... B25F 5/008 310/58 |
| 8,816,545 B2 * | 8/2014 | Fukuoka ................ H02K 7/145 310/91 |
| 8,872,398 B2 | 10/2014 | Ota |
| 8,963,392 B2 | 2/2015 | Ziegler et al. |
| 9,132,542 B2 | 9/2015 | Lau et al. |
| 9,219,392 B2 | 12/2015 | Sahara et al. |
| 9,314,900 B2 | 4/2016 | Vanko et al. |
| 9,325,224 B2 | 4/2016 | Vander Lind et al. |
| 9,680,349 B2 | 6/2017 | Tokairin et al. |
| 9,685,840 B2 | 6/2017 | Germann et al. |
| 9,724,814 B2 | 8/2017 | Yoshikane et al. |
| 9,755,479 B2 | 9/2017 | O |
| 9,762,153 B2 | 9/2017 | Forster et al. |
| 9,782,883 B2 | 10/2017 | Fuchs et al. |
| 9,908,234 B2 | 3/2018 | Fuchs et al. |
| 9,929,627 B2 | 3/2018 | Klode et al. |
| 10,011,035 B2 | 7/2018 | Nakashima |
| 10,084,360 B2 | 9/2018 | Aoyama |
| 10,193,416 B2 | 1/2019 | Germann et al. |
| 10,193,417 B2 | 1/2019 | Fogle et al. |
| 10,312,767 B2 | 6/2019 | Nishidate |
| 10,369,672 B2 | 8/2019 | Bergquist et al. |
| 10,717,182 B2 | 7/2020 | Chen et al. |
| 2001/0013732 A1 | 8/2001 | Hsu |
| 2004/0135462 A1 | 7/2004 | Masayuki |
| 2005/0035673 A1* | 2/2005 | Lafontaine ............ H02K 1/2791 310/58 |
| 2007/0145838 A1 | 6/2007 | Uchitani et al. |
| 2010/0026126 A1 | 2/2010 | Han et al. |
| 2013/0241325 A1 | 9/2013 | Lau |
| 2014/0284183 A1* | 9/2014 | Wolters ................ B65G 39/09 198/788 |
| 2015/0014007 A1 | 1/2015 | Ukai et al. |
| 2015/0047866 A1 | 2/2015 | Sakai et al. |
| 2015/0303753 A1 | 10/2015 | Huang et al. |
| 2016/0190881 A1 | 6/2016 | Kanatani et al. |
| 2017/0085140 A1 | 3/2017 | Tang et al. |
| 2017/0248145 A1 | 8/2017 | Chu et al. |
| 2017/0264177 A1 | 9/2017 | Lee et al. |
| 2017/0288494 A1 | 10/2017 | Showa et al. |
| 2017/0331355 A1 | 11/2017 | He et al. |
| 2017/0334056 A1 | 11/2017 | Kawakami et al. |
| 2017/0366061 A1 | 12/2017 | Looi et al. |
| 2018/0083503 A1 | 3/2018 | Beckman et al. |
| 2018/0091020 A1 | 3/2018 | Horng et al. |
| 2018/0123405 A1 | 5/2018 | Tang et al. |
| 2018/0212485 A1 | 7/2018 | Chu et al. |
| 2018/0233989 A1 | 8/2018 | Ishida |
| 2019/0059373 A1 | 2/2019 | Fogle |
| 2019/0074733 A1 | 3/2019 | Tomiyama et al. |
| 2019/0074751 A1 | 3/2019 | Chen |
| 2019/0181722 A1 | 6/2019 | Kajikawa et al. |
| 2020/0198100 A1 | 6/2020 | Schneider et al. |
| 2020/0343780 A1 | 10/2020 | Fogle et al. |
| 2021/0194321 A1 | 6/2021 | Jefferies |
| 2021/0331299 A1 | 10/2021 | Ellice et al. |

FOREIGN PATENT DOCUMENTS

| | | |
|---|---|---|
| CN | 107834750 A | 3/2018 |
| CN | 110535284 A | 12/2019 |
| DE | 20307048 U1 | 9/2003 |
| DE | 10320288 A1 | 12/2004 |
| DE | 102005011020 A1 | 9/2006 |
| DE | 102008058433 A1 | 6/2009 |
| DE | 102008047494 A1 | 4/2010 |
| DE | 102009026621 A1 | 4/2010 |
| DE | 202011003834 U1 | 9/2011 |
| DE | 102012102042 A1 | 9/2012 |
| DE | 102013103813 A1 | 10/2013 |
| DE | 102013204436 A1 | 9/2014 |
| DE | 102014220493 A1 | 4/2016 |
| DE | 102016109673 A1 | 12/2016 |
| DE | 102017108652 A1 | 11/2017 |
| DE | 102017218534 A8 | 7/2018 |
| DE | 112017000304 T5 | 9/2018 |
| DE | 102018118628 A1 | 2/2020 |
| DE | 102020110320 A1 | 10/2020 |
| DE | 102021201313 A1 | 8/2021 |
| EP | 1273088 A2 | 1/2003 |
| EP | 1378983 A2 | 1/2004 |
| EP | 1450467 A1 | 8/2004 |
| EP | 1250531 B1 | 10/2004 |
| EP | 1580870 A2 | 9/2005 |
| EP | 1081386 B1 | 3/2006 |
| EP | 1696537 A1 | 8/2006 |
| EP | 1622241 B1 | 2/2007 |
| EP | 1026507 B1 | 5/2007 |
| EP | 1716338 B1 | 7/2007 |
| EP | 1816727 A2 | 8/2007 |
| EP | 1993193 A1 | 11/2008 |
| EP | 1995853 A1 | 11/2008 |
| EP | 1513244 B1 | 6/2009 |
| EP | 2278690 A1 | 1/2011 |
| EP | 2368670 A2 | 9/2011 |
| EP | 2145722 B1 | 5/2012 |
| EP | 2860857 A2 | 4/2015 |
| EP | 1816729 B1 | 10/2015 |
| EP | 2838694 B1 | 3/2016 |
| EP | 3035508 A2 | 6/2016 |
| EP | 3101784 A1 | 12/2016 |
| EP | 2090780 B1 | 5/2017 |
| EP | 2948402 B1 | 6/2017 |
| EP | 3211760 A1 | 8/2017 |
| EP | 2449653 B1 | 9/2017 |
| EP | 2251148 B1 | 11/2017 |
| EP | 3300224 A1 | 3/2018 |
| EP | 2410635 B1 | 7/2018 |

(56) References Cited

FOREIGN PATENT DOCUMENTS

| | | |
|---|---|---|
| EP | 3344416 A2 | 7/2018 |
| EP | 3429069 A1 | 1/2019 |
| EP | 3496239 A1 | 6/2019 |
| EP | 3121945 B1 | 9/2019 |
| EP | 3247026 B1 | 12/2019 |
| EP | 2173022 B1 | 5/2020 |
| EP | 3326275 B1 | 2/2021 |
| FR | 2991210 A3 | 12/2013 |
| JP | 09209973 A | 8/1997 |
| JP | 2001-339902 A | 12/2001 |
| JP | 2008-312356 A | 12/2008 |
| JP | 2009-100573 A | 5/2009 |
| JP | 2014-079039 A | 5/2014 |
| JP | 5700266 B2 | 4/2015 |
| JP | 2018-93710 A | 6/2018 |
| WO | 2006102609 A2 | 9/2006 |
| WO | 2007/142299 A1 | 12/2007 |
| WO | 2015163640 A1 | 10/2015 |
| WO | 2016035358 A1 | 3/2016 |
| WO | 16088989 A1 | 6/2016 |
| WO | 16115921 A1 | 7/2016 |
| WO | 2016193044 A1 | 12/2016 |
| WO | 2017005002 A1 | 1/2017 |
| WO | 2017107315 A1 | 6/2017 |
| WO | 17144464 A1 | 8/2017 |
| WO | 2017197810 A1 | 11/2017 |
| WO | 18018905 A1 | 2/2018 |
| WO | 18054573 A1 | 3/2018 |
| WO | 18054574 A1 | 3/2018 |
| WO | 18170726 A1 | 9/2018 |
| WO | 2018207737 A1 | 11/2018 |
| WO | 2018228172 A1 | 12/2018 |
| WO | 2019199056 A1 | 10/2019 |

\* cited by examiner

OUTER-ROTOR BRUSHLESS MOTOR FOR A POWER TOOL

FIELD

This disclosure relates to a brushless motor assembly for a rotary tool, and particularly to a compact outer-rotor motor assembly for a cordless power tool such as a ratchet wrench.

BACKGROUND

A brushless direct-current (BLDC) motor typically includes a stator that is electronically commuted through various phases and a permanent magnet rotor that is rotatably driven relative to the stator as the phases of the stator are sequentially energized. The stator is commonly provided as a cylindrical core with a hollow center that receives the rotor therein. The rotor is mounted on a rotor shaft.

In some power tool applications, an outer-rotor BLDC motor is provided. Outer-rotor BLDC motors are typically capable of building more inertia in the rotor shaft due to the greater mass of the rotor and are more suitable for certain power tool applications. US Publication No. 2019/0058373, which is incorporated herein by reference, provides an example of a nailer that is provided with an outer-rotor BLDC motor, where a flywheel is integrally mounted on the outer surface of the rotor.

What is needed is a compact outer rotor motor having a high power density suitable for portable power tool applications. U.S. patent application Ser. No. 17/125,031 filed Dec. 17, 2020, which is incorporated herein by reference in its entirety, describes examples of compact outer rotor motors. This disclosure provides additional improvements on a similar compact outer-rotor motor.

SUMMARY

According to an embodiment, a power tool is provided including a housing, a brushless direct-current (BLDC) motor disposed within the housing, and a battery receptacle configured to receive a removable battery pack. The BLDC motor includes a rotor shaft on which a rear motor bearing and a front motor bearing are mounted; a motor can through which the rotor shaft extends and including a substantially cylindrical body having an open end and a radial wall distanced from the open end, the radial wall forming a first bearing pocket arranged to receive the front motor bearing therein; a stator assembly including a stator core having an aperture extending therethrough, stator teeth radially extending outwardly from the stator core and defining slots therebetween, and stator windings wound around the stator teeth; a stator mount including an axial member on which the stator assembly is mounted, and a radial member coupled to the open end of the motor can, the radial member forming a second bearing pocket arranged to support the rear motor bearing; an outer rotor comprising a cylindrical rotor core supporting at least one permanent magnet around an outer surface of the stator core; and a fan mounted on the rotor shaft inside the motor can to generate an airflow through the motor can. In an embodiment, the motor can includes exhaust openings formed around the fan to allow the airflow to be expelled radially away from the fan, and intake openings formed at a distance from the exhaust openings along a radial plane between a rear end of the stator assembly and the stator mount to allow an airstream to be received radially into the motor can for generating the airflow through the motor can.

In an embodiment, the motor includes a rotor mount configured to secure the outer rotor to the rotor shaft. The rotor mount includes an outer rim arranged to couple to the outer rotor, at least one radial element extending inwardly from the outer rim, and an inner body mounted on the rotor shaft.

In an embodiment, the radial element of the rotor mount is made up of a series of spaced apart radial elements forming the fan.

In an embodiment, the radial member of the stator mount includes openings that allow a secondary airstream to be received axially into the motor can, the airstream and the secondary airstream cooperatively generating the airflow through the motor can.

In an embodiment, the housing includes exhaust openings aligned with the exhaust openings of the motor can to allow the airflow to be expelled radially away from the housing.

In an embodiment, the housing further includes intake openings aligned with the intake openings of the motor can to receive the airstream to be received radially into the housing.

In an embodiment, the power tool does not include any additional fans for cooling the motor.

In an embodiment, the fan includes a maximum diameter that is smaller than or equal to an outer diameter of the outer rotor.

In an embodiment, the outer diameter of the outer rotor is smaller than approximately 35 mm.

In an embodiment, the outer diameter of the outer rotor is smaller than approximately 32 mm.

According to another aspect of the invention, in an embodiment, a brushless direct-current motor is provided including: a rotor shaft on which a rear motor bearing and a front motor bearing are mounted; a motor housing through which the rotor shaft extends; a stator assembly including a stator core having an aperture extending therethrough, stator teeth radially extending outwardly from the stator core and defining a slots therebetween, and stator windings wound around the stator teeth; a stator mount including an axial member on which the stator assembly is mounted, and a radial member coupled to the motor housing, the radial member forming a bearing pocket arranged to support the rear motor bearing; and an outer rotor comprising a cylindrical rotor core supporting at least one permanent magnet around an outer surface of the stator core. In an embodiment, the stator core and the radial member of the stator mount include corresponding alignment features to radially affix the stator core on the axial member.

In an embodiment, the stator core includes a stack of steel laminations, and the alignment feature of the stator core is formed integrally in the stack of steel laminations.

In an embodiment, the alignment feature of the stator core extends through at least half an axial length of the stator core.

In an embodiment, the alignment features include a tongue and groove structure.

In an embodiment, the alignment feature of the radial member of the stator mount is a groove formed through an outer circumferential surface of the radial member.

In an embodiment, the radial member of the stator mount includes an elongated cylindrical member projecting axially from the radial member into the aperture of the stator core.

In an embodiment, the motor housing includes a substantially cylindrical body having an open end and a radial wall distanced from the open end, the radial wall forming a second bearing pocket arranged to receive the front motor bearing therein.

BRIEF DESCRIPTION OF THE DRAWINGS

The drawings described herein are for illustration purposes only and are not intended to limit the scope of this disclosure in any way.

Throughout this specification and figures like reference numbers identify like elements.

DETAILED DESCRIPTION

It is to be understood that both the foregoing general description and the following detailed description are exemplary and explanatory only and are intended to provide an explanation of various embodiments of the present teachings.

Figure 1:
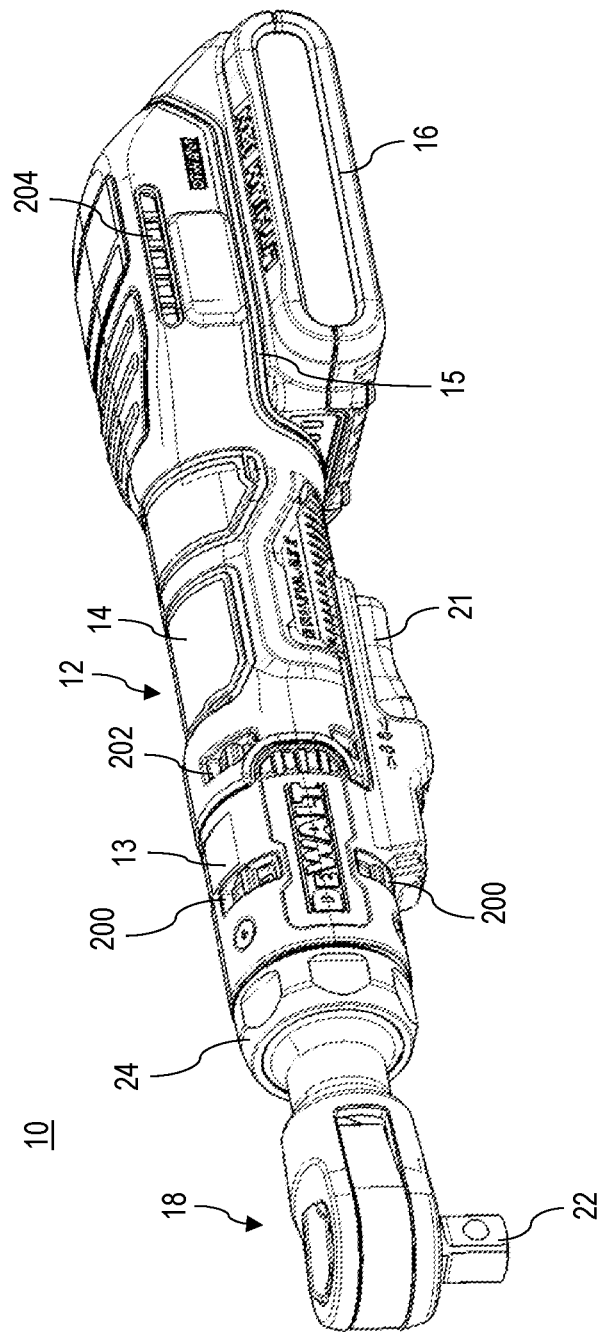
FIG. 1 depicts a perspective view of an electric power tool, according to an embodiment.
Figure 2:
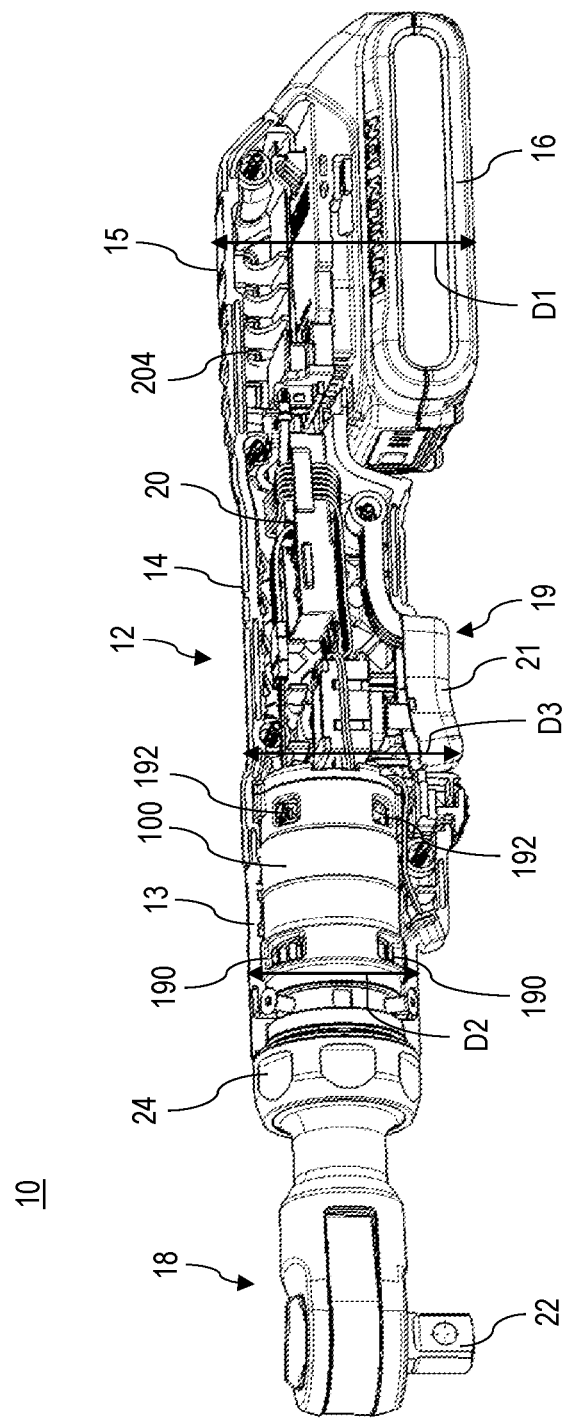
FIG. 2 depicts a side view of the electric power tool with a housing half removed to expose an outer-rotor brushless motor therein, according to an embodiment.

Referring to FIGS. 1-2, an electric power tool 10 is briefly described herein, according to an embodiment. In an embodiment, power tool 10, which in this exemplary embodiment is an electric ratchet wrench for applying torque to a fastener, includes a housing 12 formed by two clam shells. The housing 12 is elongated along a longitudinal axis and includes a motor case 13 within which an electric brushless motor 100 is disposed, a handle portion 14 extending rearwardly from the motor case 13 within which a control and/or power module 20 are supported, and a battery receiving portion 15 disposed at a rear end of the handle portion 14.

The control and/or power module 20 is thus disposed between the battery receiving portion 15 and the motor 100. In an embodiment, the control and/or power module 20 includes control and switching components, for example an inverter switch circuit controlled by a programable controller, that controls flow of electric current to the motor 100. In an embodiment, a trigger assembly 19 is mounted on the handle portion 14 of the housing 12 that electrically communicates with the control and/or switch module 20. In an embodiment, the trigger assembly 19 includes a trigger switch 21 engageable by a user. Actuation of the trigger switch 21 sends a signal to the controller to begin operating the motor 100.

In an embodiment, the battery receiving portion 15 is configured to receive and lock in a sliding battery pack 16, such as a 20V Max power tool battery pack. In an embodiment, the battery receiving portion 15 allows the battery pack 16 to be received along a sliding axis that is substantially parallel to the longitudinal axis of the housing 12. This ensures that the battery pack 16 is contained within approximately an envelope of the housing 12. In an embodiment, when viewed from a side, the total width D1 of the battery receiving portion 15 plus the battery pack 16 is between approximately 25% to 40% greater than a width D2 of the motor case formed around the motor 100, and between approximately 15% to 25% greater than a width D3 formed by the trigger switch 21 and the handle portion 14.

In an embodiment, a ratchet head 18 is mounted on a front end of the housing 12 forward of the motor case 13. In an embodiment, motor 100 is orientated along the longitudinal axis of the housing 12 to provide a rotary output to the ratchet head 18 to drive an output member 22. In an embodiment, as described later in detail, a nut 24 is mounted at the end of the housing 12 to secure the ratchet head 18 to the motor 100.

Figure 3:
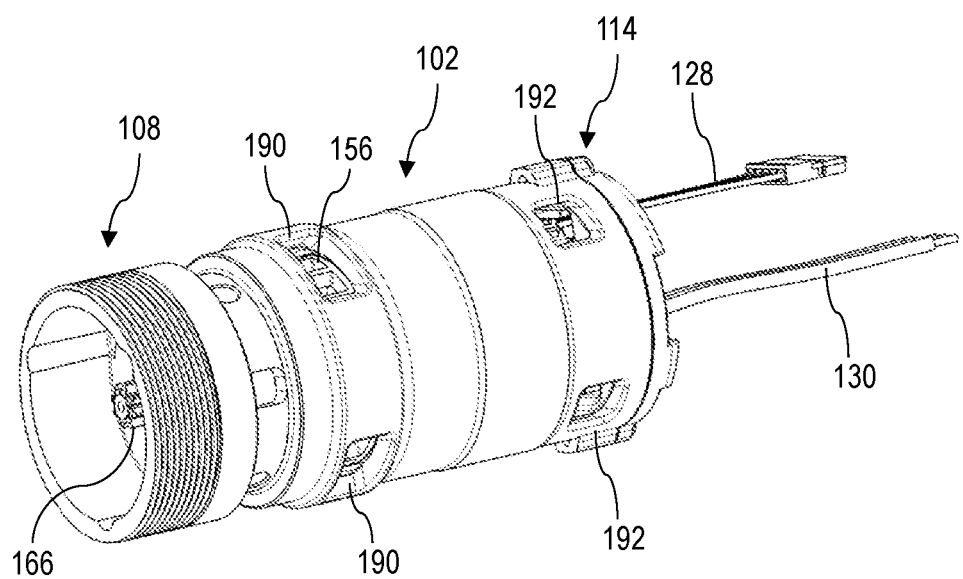
FIG. 3 depicts a side perspective view of the motor, according to an embodiment.
Figure 4:
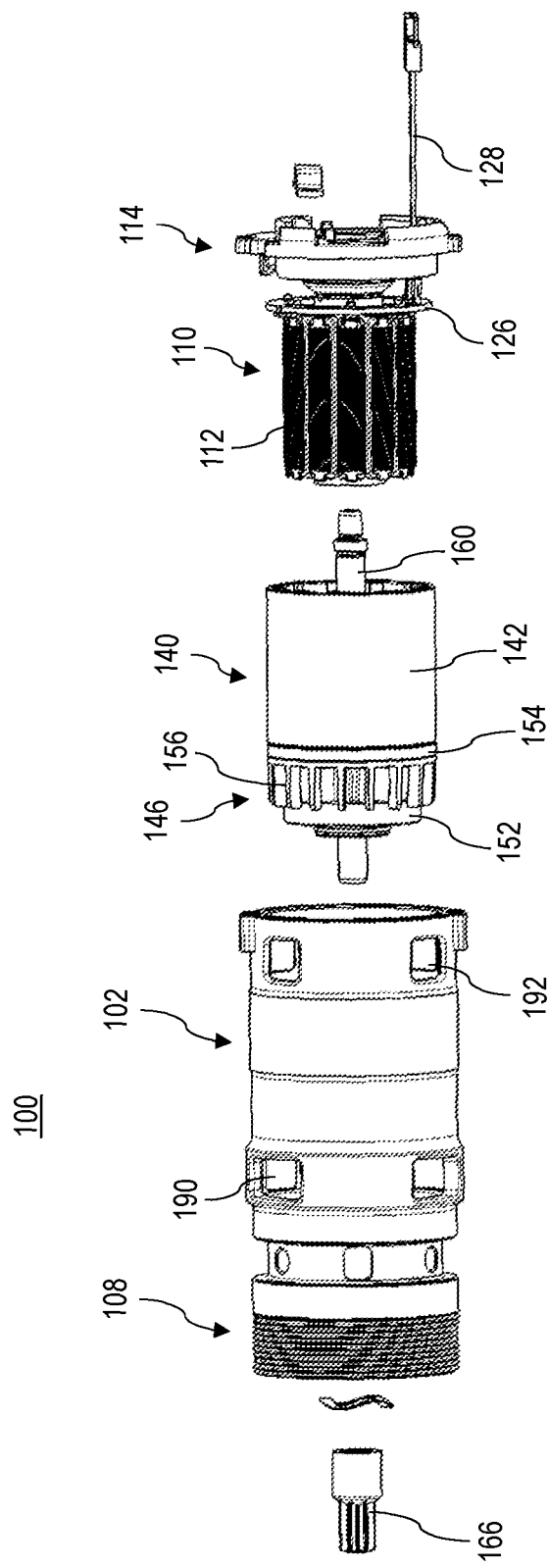
FIG. 4 depicts a side exploded view of the motor, according to an embodiment.
Figure 5:
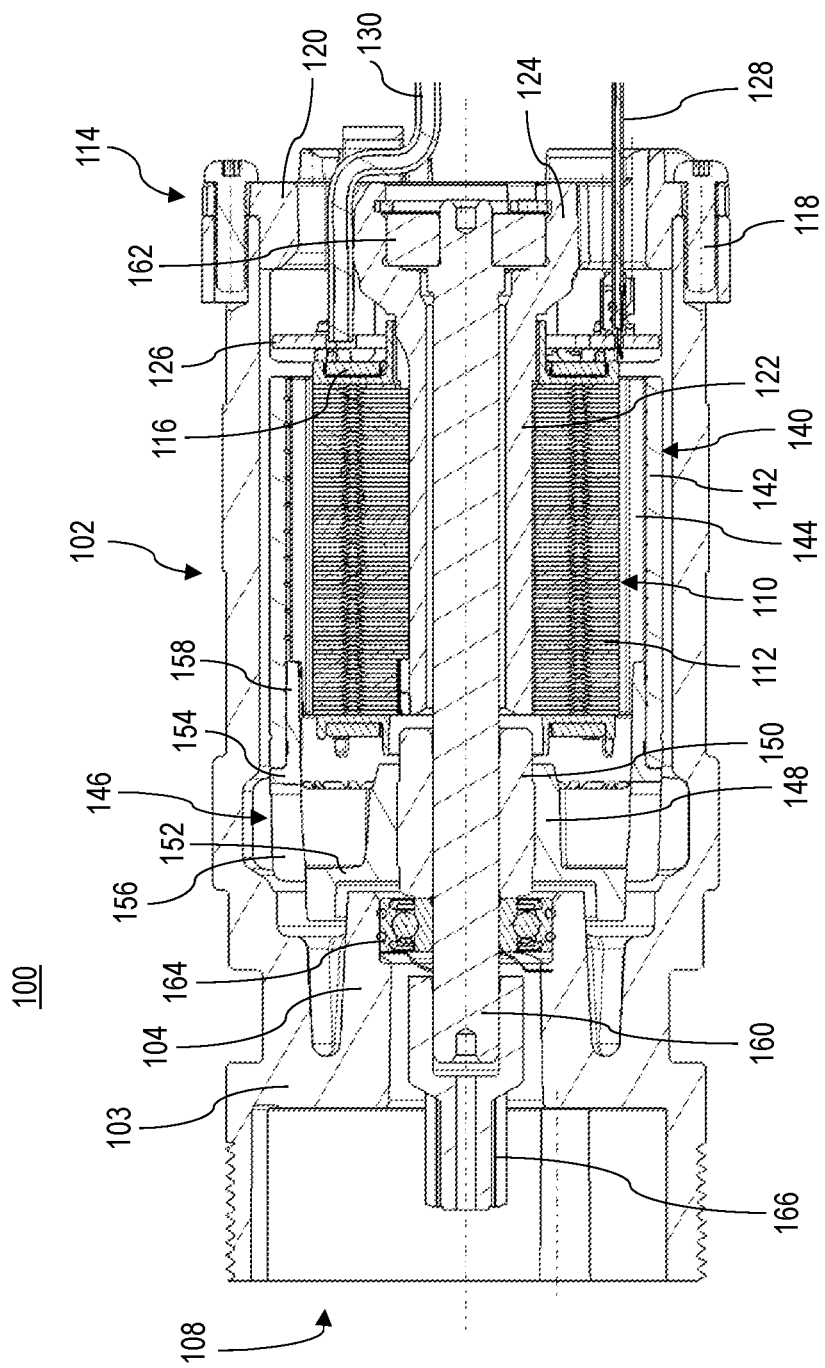
FIG. 5 depicts a side cross-sectional view of the motor, according to an embodiment.

FIG. 3 depicts a side perspective view of the motor 100, according to an embodiment. FIG. 4 depicts a side exploded view of the motor 100, according to an embodiment. FIG. 5 depicts a side cross-sectional view of the motor 100, according to an embodiment.

As shown in these figures, motor 100 is an outer-rotor brushless (BLDC) motor 100 contained in a motor can (or motor housing) 102. In an embodiment, motor 100 includes an inner stator assembly 110 disposed within an outer rotor assembly 140, according to an embodiment.

In an embodiment, stator assembly 110 includes a stator lamination stack 112 formed by a series of steel laminations. The stator lamination stack 112 is mounted on a stator mount 114 and supports a series of stator windings 116. In an exemplary embodiment, the stator windings 116 are wound in three phases, which, when respectively energized by the control and/or power module 20, cause rotation of the rotor assembly 140. Further, in an embodiment, a set of power wires 130 are received through the stator mount 114 and coupled to the stator windings 116.

In an embodiment, the stator mount 114 includes an elongated cylindrical portion 122 sized to be received securely within a central aperture of the stator lamination stack 112. In an embodiment, the stator lamination stack 112 may be press-fitted over the cylindrical portion 122 of the stator mount 114. In an embodiment, stator mount 114 further includes a radial body 120 at an end of the cylindrical portion 122 outside the body of the stator lamination stack 112. The radial body 120 forms a center bearing support pocket 124, which as described below, securely receives a rear bearing 162 of the rotor assembly 140.

In an embodiment, a positional sensor board 126 is mounted on an end of the stator lamination stack 112, between the stator lamination stack 112 and the stator mount 114. In an embodiment, the positional sensor board 126 includes a series of Hall sensors positioned for sensing a rotary position of the rotor assembly 140. A set of signal wires 128 are secured to the positional sensor board 126 to carry signals from the Hall sensors to the control and/or power module 20.

In an embodiment, rotor assembly 140 includes a cylindrical rotor core 142 formed around the stator assembly 110, and a series of permanent magnets 144 surface-mounted on the inner surface of the rotor core 142 facing the stator assembly 110 with a small airgap therebetween. As the stator windings 116 are energized in a controlled pattern, they magnetically interact with permanent magnets 144, thus causing the rotation of the rotor. In an embodiment, the rotor assembly 140 mounted securely on a rotor shaft 160 via a rotor mount 146. Rotation of the rotor assembly 140 causes rotation of the rotor shaft 160. A pinion 166 is mounted on a front end of the rotor shaft 160 for coupling the rotor shaft 160 to gear components (not shown) of the ratchet head 18.

In an embodiment, rotor mount 146 includes an inner body 148 that is substantially cylindrical and is mounted on the rotor shaft 160 via a bushing 150. The rotor mount 146 further includes a radial body 152 extending from the inner body 148 and an outer ring 154 that is securely coupled to the end of the rotor core 142 via a lip 158 shaped to be form-fittingly received through the end of the rotor core 143. A fan 156 is formed by a series of spaced-apart fan blades extending between the radial body 152 and the outer ring 154. As the rotor assembly 140 is rotated, the fan 156 generates an airflow through the stator assembly 110 and the rotor assembly 140.

U.S. patent application Ser. No. 17/125,031 filed Dec. 17, 2020, which is incorporated herein by reference in its entirety, provides further detail on the features described above and is referenced for further detail.

In an embodiment, motor can 102 includes a generally cylindrical body having two open ends. The stator assembly 110 and rotor assembly 140 are received within the motor can 102, with an air gap maintained between the rotor core 142 and the inner surface of the motor can 102.

In an embodiment, the stator mount 114 is secured to one end of the motor can 102 via a set of fasteners 118. Since the cylindrical portion 122 of the stator mount 114 supports the stator assembly 110, the stator mount 114 provides structural support for the stator assembly 110 relative to the motor can 102.

In an embodiment, the rotor mount 146 is received within the motor can 102 along with the rotor assembly 140. The motor can 102 includes a radial wall 103 that projects inwardly and forms a bearing support pocket 104 adjacent the rotor mount 146. The bearing support pocket 104 receives a front bearing 164 of the rotor shaft 160. Further, since the bearing support pocket 124 of the stator mount 114 supports the rear bearing 162, the stator mount 114 and the motor can 102 cooperatively provides structural support for the rotor assembly 140 to be freely rotatably within the motor can 102. In an embodiment, the rotor shaft 160 extends through the bearing support pocket 104. The pinion 166, which is coupled to the end of the rotor shaft 160, is provided within the front portion 108 of the motor can 102.

Figure 6:
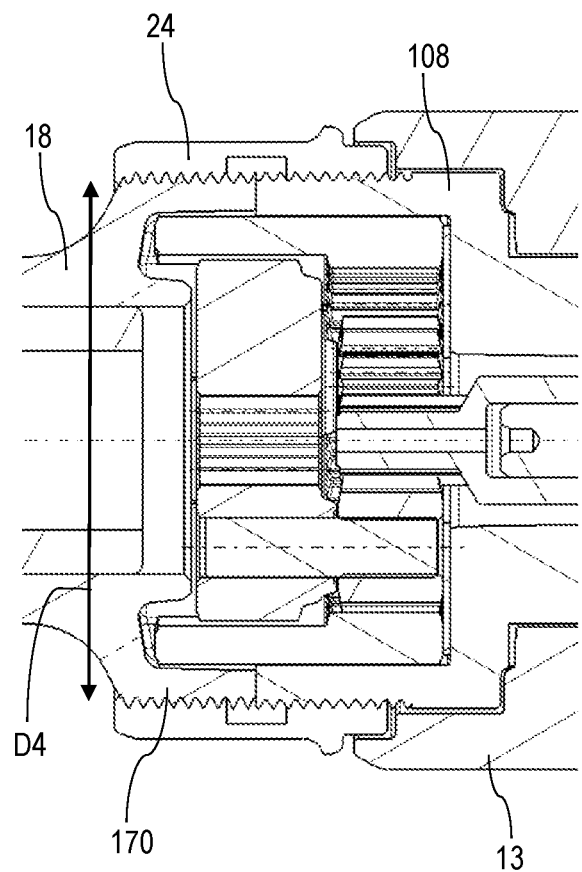
FIG. 6 depicts a partial cross-sectional view of a front portion of the motor can coupled to a ratchet head, according to an embodiment.

FIG. 6 depicts a partial cross-sectional view of the front portion 108 of the motor can 102 coupled to the ratchet head 18. In an embodiment, the ratchet head 18 includes an open rear end 170 that includes approximately the same outer diameter D4 as the front portion 108 of the motor can 102. The outer circumferences of both the open rear end 170 of the ratchet head 18 and the front portion 108 of the motor can 102 are threaded, providing a uniform outer surface that allows the nut 24 to be fastened and securely support the ratchet head 18 to the motor can 102. In an embodiment, the nut 24 has an outer diameter that is smaller than or equal to the diameter of the motor case 13.

Figure 7:
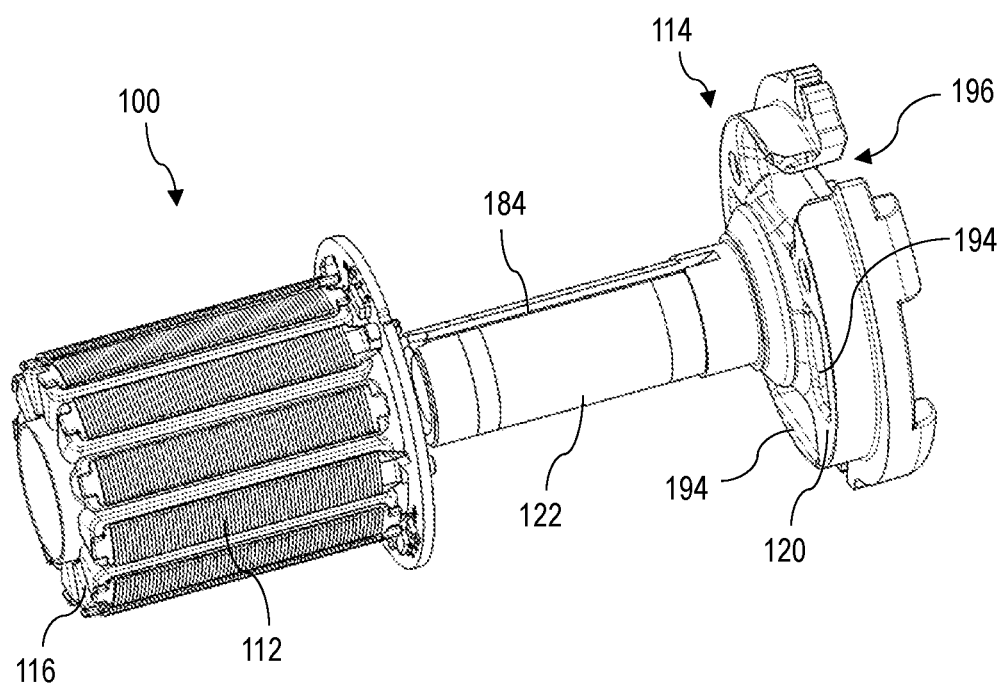
FIG. 7 depicts a partial exploded view of the stator assembly and the stator mount, according to an embodiment.
Figure 8:
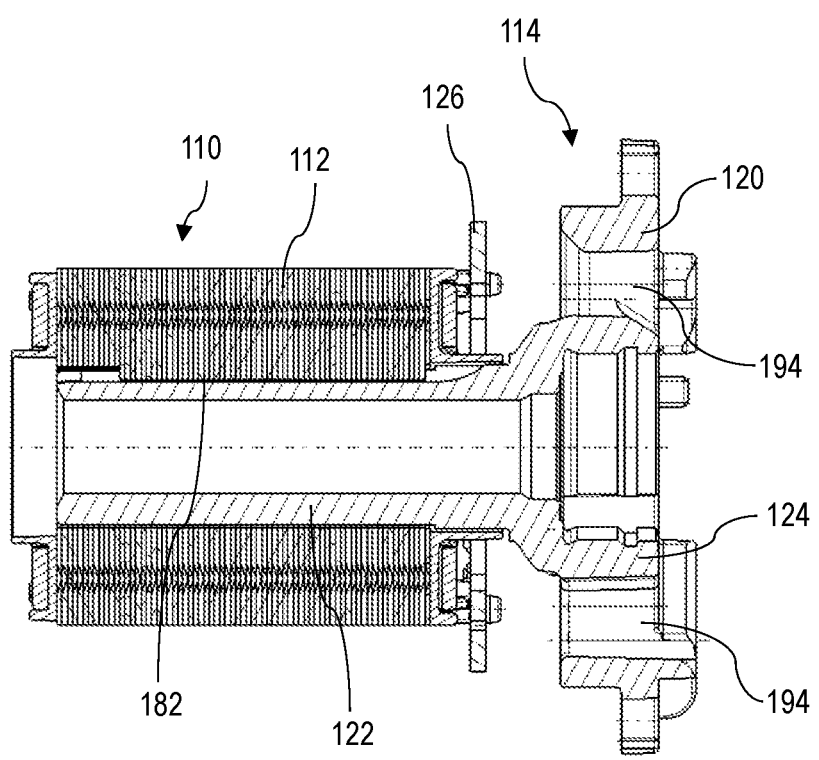
FIG. 8 depicts a partial side cross-sectional view of the stator assembly and the stator mount, according to an embodiment.
Figure 9:
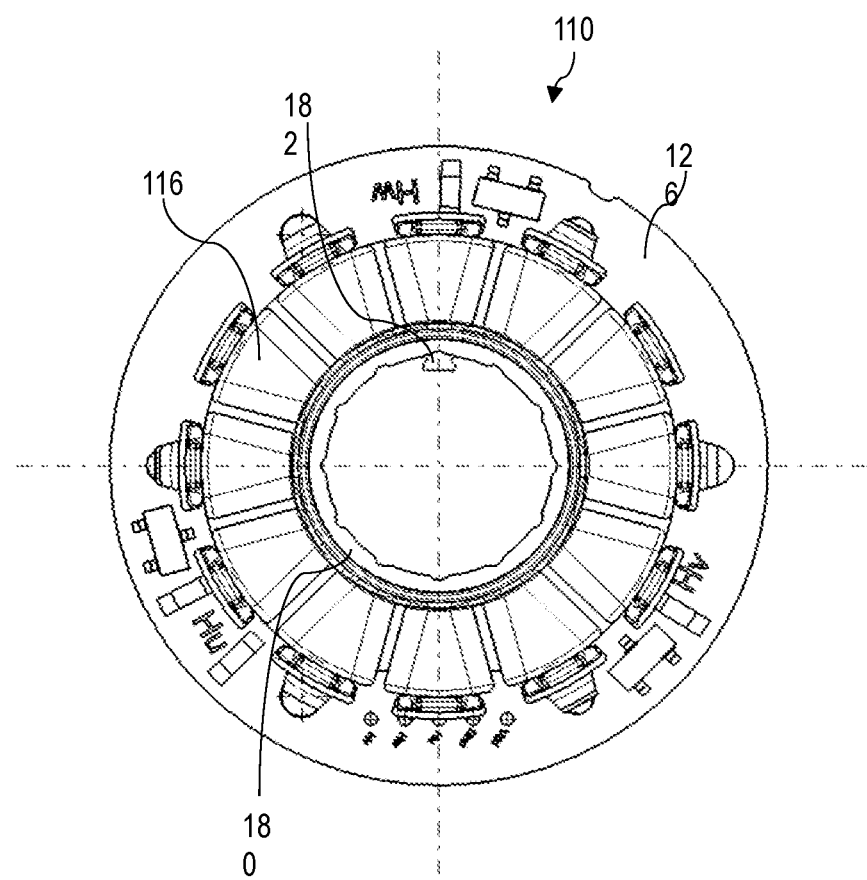
FIG. 9 depicts an axial view of the stator assembly, according to an embodiment.

FIG. 7 depicts a partial exploded view of the stator assembly 110 and the stator mount 114, according to an embodiment. FIG. 8 depicts a partial side cross-sectional view of the stator assembly 110 and the stator mount 114, according to an embodiment. FIG. 9 depicts an axial view of the stator assembly 110, according to an embodiment.

As shown in these figures, according to an embodiment, the stator lamination stack 112 of the stator assembly 110 includes a stator core 180 mounted having an annular body sized to be fittingly mounted on the elongated cylindrical portion 122 of the stator mount 114. The lamination stack 112 further includes on a series of radially-outwardly projecting teeth on which the stator windings 116 are wound. The elongated cylindrical portion 122 of the stator mount 114 extends approximately through the entire length of the stator lamination stack 112.

To properly align the stator mount 114 and the stator assembly 110 during the assembly process, in an embodiment, a tongue and groove structure is provided. In an embodiment, the stator core 180 is provided with a tongue 182 that projects radially from its inner surface. The tongue 182 may be approximately 0.5 to 1 millimeter in lateral width, and in an embodiment, extends through approximately half to ¾ of the length of stator lamination stack 112. In an embodiment, tongue 182 may be formed by forming at least a subset of the steel laminations using a die that integrally incorporates the tongue 182 into the lamination stack 112. In an embodiment, the elongated cylindrical portion 122 of the stator mount 114 is provided with a corresponding groove 184 sized to slidingly receive the tongue 182 therein as the stator assembly 110 is mounted.

It should be understood that in an exemplary embodiment, the cylindrical portion 122 of the stator mount 114 may be provided with a tongue and the stator lamination stack 112 of the stator assembly 110 may be provided with a corresponding groove. It should further be understood that instead of a tongue and groove structure, other alignment and/or poka-yoke structures may be utilized to radially align the stator mount 114 and the stator assembly 110.

Referring to FIGS. 1-4, 7 and 8, in an embodiment, the motor can 102 is provided with a series of exhaust openings 190 formed radially around the fan 156. In an embodiment, four exhaust openings 190 are provided around the fan 156. The motor case 13 portion of the housing 12 similarly includes a series of exhaust openings 200 radially aligned with the exhaust openings 190 of the motor can 102. As the fan 156 rotates, the airflow generated through the motor 100 is radially expelled through the exhaust openings 190 of the motor can 102 and exhaust openings 200 of the tool housing 12. In an embodiment, the radial wall 103 of the motor can 102 and/or the stator assembly 110 cooperatively or individually form a baffle for the fan 156 to expel the airflow radially.

In an embodiment, the motor can 102 further includes a series of radial intake openings 192 provided near a rear end of the motor can 102 adjacent the stator mount 114. In an embodiment, the radial intake openings 192 are provided along a radial plane between the positional sensor board 126 and the stator mount 114. In an embodiment, four intake openings 192 are provided in alignment with the exhaust openings 190. The housing 12 similarly includes a series of radial intake openings 202 radially aligned with the intake openings 192 of the motor can 102. In an embodiment, the radial intake openings 192 of the motor can 102 and the radial intake openings 202 of the housing 12 cooperate to allow entry of a first airstream of ambient air in the radial direction into the motor can 102, bypassing the handle portion 14 of the housing 12. Further, in an embodiment, the housing 12 includes a second set of intake openings 204 provided at or adjacent the battery receiving portion 15, which allow entry of a second airstream of ambient air through at least the handle portion 14 of the housing 12. In an embodiment, the stator mount 114 includes a series of openings 194 formed in the radial body 120. The openings 194 allow entry of the second airstream from the handle portion 12 along approximately the axial direction into the motor can 102. Accordingly, the total airflow in the motor can 102 includes the first airstream received radially through the radial intake openings 192 and the second airstream received through the openings 194 of the radial body 120.

In an embodiment, the fan 156 is fully contained within the motor can 102 and includes an outer diameter that is approximately smaller than or equal to the outer diameter of the rotor core 142. In an embodiment, the maximum diameter of the rotor core 142 is smaller than approximately 35 mm, preferably smaller than approximately 32 mm, preferably smaller than approximately 30.5 mm. This arrangement allows the motor case 13 of the tool housing 12 to include a small diameter, particularly in a front portion of the housing 12 where the ratchet head 18 is mounted. In an embodiment, motor case 13 includes an outer diameter that is smaller than approximately 45 mm, at least in a lateral direction, and at least at the front portion of the housing 12.

In an embodiment, the fan 156 rotates at a top no-load speed of approximately greater than or equal to 22,000 rpm, preferably greater than 27,000 rpm. In an embodiment, the ratchet head 18 provides significant gear reduction, which enables the fan 156 to rotate at a significantly higher speed than the output member 22. The rotational speed of the fan 156, combined with the arrangement of the air intake and exhaust openings described above, provide sufficient cooling airflow for the motor 100 and other power tool 10 components without a need for a secondary fan and despite the small diameter of the fan 156. This is a significant improvement over similar compact motor applications that typically require a fan having a larger diameter than the rotor core to efficiently cool the motor.

In an embodiment, at least one of the openings 194 of the radial body 120 extends to the outer periphery of the radial body 120 forming a cutout area 196. The cutout area 196 allows the power wires 130 and/or the signal wires 128 to be radially slid into the corresponding opening 194 after the stator assembly 110 is mounted on the stator mount 114. This eliminates the additional step of axially inserting the power wires 130 and/or the signal wires 128 into the opening 194 prior to mounting the stator assembly 110 on the stator mount 114.

Example embodiments have been provided so that this disclosure will be thorough, and to fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Terms of degree such as "generally," "substantially," "approximately," and "about" may be used herein when describing the relative positions, sizes, dimensions, or values of various elements, components, regions, layers and/or sections. These terms mean that such relative positions, sizes, dimensions, or values are within the defined range or comparison (e.g., equal or close to equal) with sufficient precision as would be understood by one of ordinary skill in the art in the context of the various elements, components, regions, layers and/or sections being described.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A power tool comprising a housing, a brushless direct-current (BLDC) motor disposed within the housing, and a battery receptacle configured to receive a removable battery pack, the BLDC motor comprising:
    a rotor shaft on which a rear motor bearing and a front motor bearing are mounted;
    a motor can through which the rotor shaft extends and including a substantially cylindrical body having an open end and a radial wall distanced from the open end, the radial wall forming a first bearing pocket arranged to receive the front motor bearing therein;
    a stator assembly including a stator core having an aperture extending therethrough, a plurality of stator teeth radially extending outwardly from the stator core and defining a plurality of slots therebetween, and a plurality of stator windings wound around the plurality of stator teeth;

a stator mount including an axial member on which the stator assembly is mounted, and a radial member coupled to the open end of the motor can, the radial member forming a second bearing pocket arranged to support the rear motor bearing;

an outer rotor comprising a cylindrical rotor core supporting at least one permanent magnet around an outer surface of the stator core; and a fan mounted on the rotor shaft inside the motor can to generate an airflow through the motor can;

wherein the motor can includes a plurality of exhaust openings formed around the fan to allow the airflow to be expelled radially away from the fan, and a plurality of intake openings formed at a distance from the plurality of exhaust openings along a radial plane between a rear end of the stator assembly and the stator mount to allow an airstream to be received radially into the motor can for generating the airflow through the motor can.

2. The power tool of claim 1, wherein the motor further comprises a rotor mount configured to secure the outer rotor to the rotor shaft, the rotor mount including an outer rim arranged to couple to the outer rotor, at least one radial element extending inwardly from the outer rim, and an inner body mounted on the rotor shaft.

3. The power tool of claim 2, wherein the at least one radial element of the rotor mount comprises a series of spaced apart radial elements forming the fan.

4. The power tool of claim 1, wherein the radial member of the stator mount includes a plurality of openings that allow a secondary airstream to be received axially into the motor can, the airstream and the secondary airstream cooperatively generating the airflow through the motor can.

5. The power tool of claim 1, wherein the housing comprises a plurality of exhaust openings aligned with the plurality of exhaust openings of the motor can to allow the airflow to be expelled radially away from the housing.

6. The power tool of claim 5, wherein the housing further comprises a plurality of intake openings aligned with the plurality of intake openings of the motor can to receive the airstream to be received radially into the housing.

7. The power tool of claim 1, wherein the power tool does not include any additional fans for cooling the motor.

8. The power tool of claim 1, wherein the fan includes a maximum diameter that is smaller than or equal to an outer diameter of the outer rotor.

9. The power tool of claim 8, wherein the outer diameter of the outer rotor is smaller than approximately 35 mm.

10. The power tool of claim 8, wherein the outer diameter of the outer rotor is smaller than approximately 32 mm.

11. A brushless direct-current motor comprising:

a rotor shaft on which a rear motor bearing and a front motor bearing are mounted;

a motor housing;

a stator assembly including a stator core having an aperture extending therethrough, a plurality of stator teeth radially extending outwardly from the stator core and defining a plurality of slots therebetween, and a plurality of stator windings wound around the plurality of stator teeth;

a stator mount including an axial member on which the stator assembly is mounted, and a radial member coupled to the motor housing, the radial member forming a bearing pocket arranged to support the rear motor bearing;

an outer rotor comprising a cylindrical rotor core supporting at least one permanent magnet around an outer surface of the stator core; and alignment features comprising a tongue and groove arrangement extending axially along an inner surface of the stator core and an outer circumferential surface of the axial member of the stator mount to radially affix the stator core on the axial member.

12. The motor of claim 11, wherein the stator core comprises a stack of steel laminations, and the alignment feature of the stator core is formed integrally in the stack of steel laminations.

13. The motor of claim 11, wherein the alignment feature of the stator core extends through at least half an axial length of the stator core.

14. The motor of claim 11, wherein the alignment feature of the axial member of the stator mount is a groove formed through the outer circumferential surface of the axial member.

15. The motor of claim 14, wherein the axial member of the stator mount includes an elongated cylindrical member projecting axially from the radial member into the aperture of the stator core.

16. The motor of claim 11, wherein the motor housing includes a substantially cylindrical body having an open end and a radial wall distanced from the open end, the radial wall forming a second bearing pocket arranged to receive the front motor bearing therein.

17. A power tool comprising a housing, the brushless direct-current (BLDC) motor of claim 11 disposed within the housing, and a battery receptacle configured to receive a removable battery pack.

* * * * *